United States Patent
Suzuki et al.

(10) Patent No.: US 9,866,819 B2
(45) Date of Patent: Jan. 9, 2018

(54) DISTANCE MEASURING APPARATUS, VEHICLE AND METHOD OF CALIBRATION IN DISTANCE MEASURING APPARATUS

(71) Applicants: Shuichi Suzuki, Kanagawa (JP); Mitsuru Nakajima, Kanagawa (JP); Motoyasu Murai, Tokyo (JP)

(72) Inventors: Shuichi Suzuki, Kanagawa (JP); Mitsuru Nakajima, Kanagawa (JP); Motoyasu Murai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 378 days.

(21) Appl. No.: 14/314,452

(22) Filed: Jun. 25, 2014

(65) Prior Publication Data
US 2015/0002638 A1   Jan. 1, 2015

(30) Foreign Application Priority Data

Jun. 27, 2013   (JP) .................. 2013-134570
Jun. 23, 2014   (JP) .................. 2014-128261

(51) Int. Cl.
| | |
|---|---|
| *H04N 13/02* | (2006.01) |
| *G01C 3/08* | (2006.01) |
| *B60R 11/04* | (2006.01) |
| *G01B 11/02* | (2006.01) |

(Continued)

(52) U.S. Cl.
CPC ......... *H04N 13/0246* (2013.01); *B60R 11/04* (2013.01); *G01B 11/026* (2013.01);
(Continued)

(58) Field of Classification Search
CPC ....... B60R 11/04; G01B 11/026; G01B 11/14; G01C 3/08; G06T 2207/10012; G06T 2207/30261; G06T 7/002; H04N 13/0018; H04N 13/0246

USPC .......................................................... 348/47
See application file for complete search history.

(56) References Cited

U.S. PATENT DOCUMENTS

| | | | |
|---|---|---|---|
| 8,130,368 B2 | 3/2012 | Eno et al. | |
| 2006/0114320 A1* | 6/2006 | Nagaoka | ................ G06T 7/002 |
| | | | 348/118 |

(Continued)

FOREIGN PATENT DOCUMENTS

| | | |
|---|---|---|
| EP | 1 645 844 A1 | 4/2006 |
| JP | 2008-292370 | 12/2008 |
| JP | 2012-167944 | 9/2012 |
| WO | WO 2009/119229 A1 | 10/2009 |

OTHER PUBLICATIONS

The Extended European Search Report dated Oct. 30, 2014, in Application No. / Patent No. 14174341.9-1557.

(Continued)

*Primary Examiner* — Anner N Holder
(74) *Attorney, Agent, or Firm* — Oblon, McClelland, Maier & Neustadt, L.L.P.

(57) ABSTRACT

A distance measuring apparatus is installed in a thing and a distance between the thing and a measuring target varies. The distance measuring apparatus includes a plurality of imaging devices; a first distance acquisition part that acquires a first distance to the measuring target based on respective sets of image data taken by the plurality of imaging devices; a second distance acquisition part that acquires a second distance to the measuring target based on a reflected wave of an electromagnetic wave irradiated onto the measuring target; and a holding member that holds the plurality of imaging devices and the second distance acquisition part.

20 Claims, 12 Drawing Sheets

(51) Int. Cl.
*G01B 11/14* (2006.01)
*H04N 13/00* (2006.01)
*G06T 7/80* (2017.01)

(52) U.S. Cl.
CPC ............ *G01B 11/14* (2013.01); *G01C 3/08* (2013.01); *G06T 7/85* (2017.01); *H04N 13/0018* (2013.01); *G06T 2207/10012* (2013.01); *G06T 2207/30261* (2013.01)

(56) References Cited

U.S. PATENT DOCUMENTS

| | | |
|---|---|---|
| 2006/0210113 A1* | 9/2006 | Fujioka ............... G01S 13/86 382/104 |
| 2010/0118291 A1* | 5/2010 | Imada ................. G01C 3/08 356/3.12 |
| 2011/0018973 A1 | 1/2011 | Takayama |
| 2013/0077083 A1 | 3/2013 | Suzuki et al. |
| 2013/0120734 A1 | 5/2013 | Ogata et al. |
| 2013/0229645 A1 | 9/2013 | Suzuki et al. |
| 2014/0003062 A1 | 1/2014 | Yoshimura et al. |
| 2014/0034817 A1 | 2/2014 | Nakamura et al. |
| 2014/0071428 A1 | 3/2014 | Suzuki et al. |

OTHER PUBLICATIONS

U.S. Appl. No. 13/930,030, filed Jun. 28, 2013.
U.S. Appl. No. 13/909,340, filed Jun. 4, 2013.

* cited by examiner

DISTANCE MEASURING APPARATUS, VEHICLE AND METHOD OF CALIBRATION IN DISTANCE MEASURING APPARATUS

BACKGROUND OF THE INVENTION

1. Field of the Invention

The present invention relates to a distance measuring apparatus that measures a distance to a measuring target, a vehicle including the distance measuring apparatus and a method of calibration in the distance measuring apparatus.

2. Description of the Related Art

A stereoscopic camera is known which takes image data of a measuring target by using a plurality of imaging devices installed at a plurality of positions and measures a distance to or a position of the measuring target by using a difference in image positions (parallax) between the respective sets of image data of the measuring target taken by the plurality of imaging devices. Such stereoscopic cameras are used in safety apparatuses in ships, railway vehicles and so forth, and a Factory Automation (FA) field.

Such a stereoscopic camera is used, for example, in a system in which a stereoscopic camera is mounted in a vehicle and a driver's driving operation is assisted by providing information of the vehicle-to-vehicle distance, a presence of a pedestrian around the vehicle, if any, and so forth to the driver. In such a vehicle driving assistance system, improvements in the distance measuring range and the distance measuring precision are demanded.

Relationship between a parallax and a distance in a stereoscopic camera depends on various parameters concerning the stereoscopic camera (hereinafter, referred to as "stereoscopic camera parameters"). The stereoscopic camera parameters are determined by the respective image center positions of the plurality of cameras, the focal distances thereof, relative positions among the cameras and the attitudes.

When a distance is measured by using a stereoscopic camera, calibration is carried out in advance for the purpose of identifying the parameters of the respective cameras included in the stereoscopic camera. The precision in the calibration of the stereoscopic camera affects the precision of distance measurement in the stereoscopic camera.

It is difficult to directly measure the stereoscopic camera parameters. Therefore, the stereoscopic camera parameters are estimated, for example, by taking an image of a calibration target for which the three-dimensional coordinate values are known by the respective cameras and using the taken images for the estimation.

The calibration precision concerning a stereoscopic camera depends on the installation accuracy of a calibration target and the cameras.

Therefore, in order to improve the calibration precision concerning a stereoscopic camera, a technology is disclosed using a laser range finder separately installed behind the stereoscopic camera (for example, see Japanese Laid-Open Patent Application No. 2012-167944 (Patent Reference No. 1)). According to the technology of Patent Reference No. 1, the distance from the laser range finder to the stereoscopic camera and the distance to the calibration target are measured, respectively, thereby the distance from the stereoscopic camera to the calibration target is acquired, and thus, the calibration precision is improved.

Further, another technology is disclosed. In the technology, in order to improve the calibration precision of a stereoscopic camera, a laser light emitting unit is provided among a plurality of cameras included in the stereoscopic camera and a light emitting point due to plasma is formed in front. Then, the light emitting point is used as a reference point at a time of calibration (for example, see International Patent Publication No. WO2009/119229 (Patent Reference No. 2)).

SUMMARY OF THE INVENTION

According to one aspect of the present invention, a distance measuring apparatus is installed in a thing. A distance between the thing and a measuring target varies. The distance measuring apparatus includes a plurality of imaging devices; a first distance acquisition part that acquires a first distance to the measuring target based on respective sets of image data taken by the imaging devices; a second distance acquisition part that acquires a second distance to the measuring target based on a reflected wave of an electromagnetic wave irradiated onto the measuring target; and a holding member that holds the imaging devices and the second distance acquisition part.

Other objects, features and advantages of the present invention will become more apparent from the following detailed description when read in conjunction with the accompanying drawings.

DETAILED DESCRIPTION OF THE EMBODIMENTS

Figure 1:
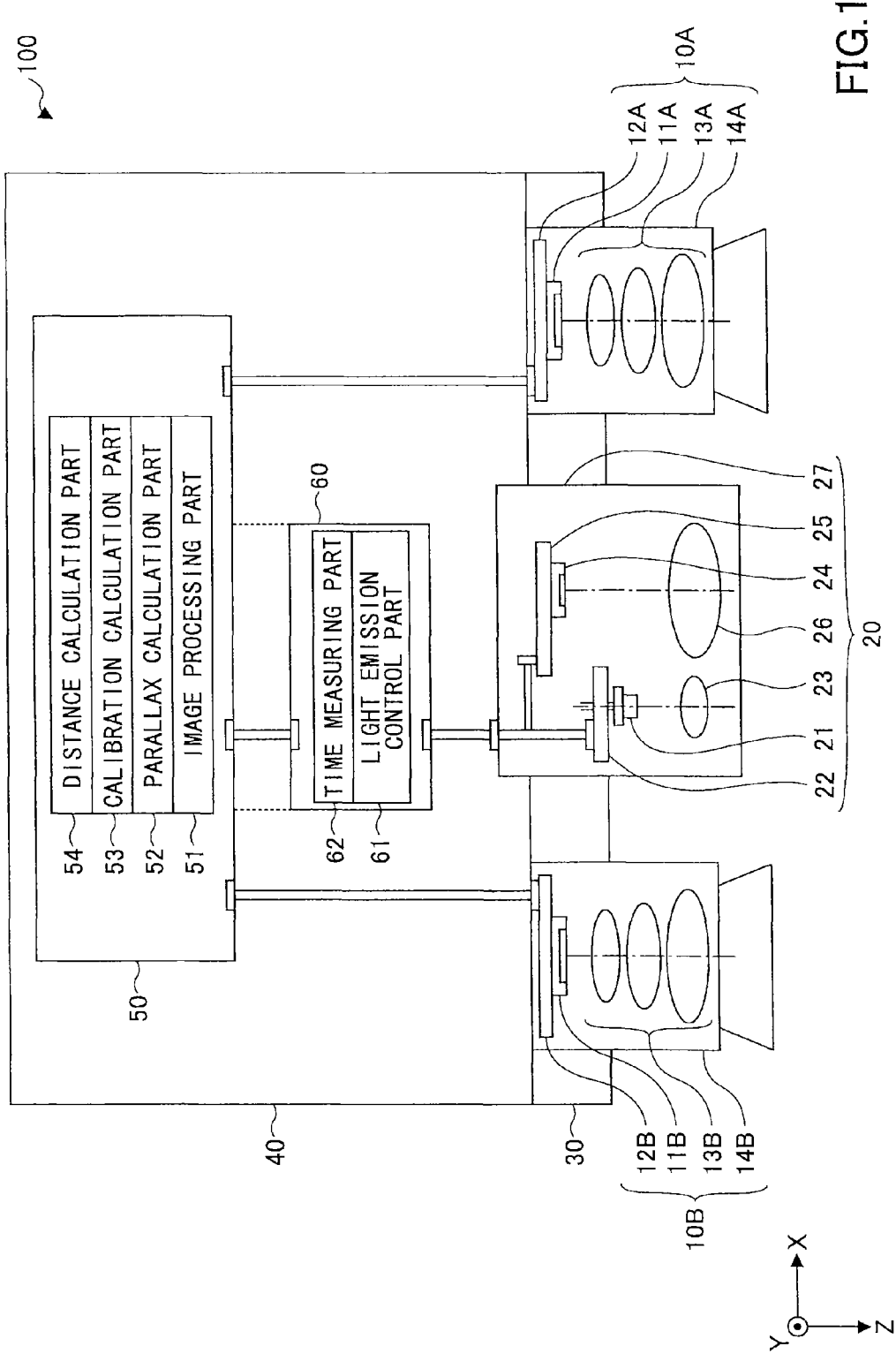
FIG. 1 is a schematic diagram showing a distance measuring apparatus in an embodiment of the present invention.

Below, using the drawings, the embodiments of the present invention will be described in detail.

First, a problem to be solved by the embodiments will now be described.

When a stereoscopic camera is mounted in a vehicle, generally speaking, it is mounted in a vehicle cabin, for example, between a windshield and a rearview mirror. Therefore, the stereoscopic camera parameters are affected by the windshield. Thus, it is preferable that, in order to ensure the measurement precision, calibration of the stereoscopic camera is carried out in a state where it is mounted in an actual installation position.

However, in the related art, it is difficult to carry out calibration in a state (usage state) where a stereoscopic camera is mounted in a vehicle or the like.

According to the technology described in Patent Reference No. 1, it is necessary to adjust the positional relationship between the laser range finder and both the stereoscopic camera and the calibration target with high accuracy. More specifically, according to the technology described in Patent Reference No. 1, such equipment (for example, an adjustment stage) for adjusting a measuring axis of the laser range finder is needed. Therefore, it may be difficult to carry out calibration of the stereoscopic camera in a usage state.

Further, according to the technology described in Patent Reference No. 1, in addition to the stereoscopic camera, the laser range finder is installed in the vehicle cabin. Then, calibration is carried out while the position of the laser range finder is adjusted. Therefore, workability may be very low.

Further, according to the technology described in Patent Reference No. 1, when the stereoscopic camera is installed in the vehicle cabin, the rearview mirror present between the stereoscopic camera and the laser range finder may block the light beam of the laser range finder. As a result, according to the technology described in Patent Reference No. 1, it may be impossible to measure the distance to the calibration target.

On the other hand, according to the technology described in Patent Reference No. 2, a light emitting point is generated due to plasma in a space before a vehicle. Therefore, it is necessary to concentrate laser pulses having very high energy at a predetermined space.

According to a known method of using laser light to form a spatial visible image, it is necessary to concentrate energy of wavelength 1064 nm and more than or equal to 100 mJ output at one point in a space by using a Yttrium Aluminum Garnet (YAG) laser, for example.

In other words, according to the technology described in Patent Reference No. 2, it is necessary to control invisible light having extremely high energy at a time of calibration of a stereoscopic camera. Therefore, it is necessary to pay full attention to ensure safety at a time of calibration work. That is, according to the technology described in Patent Reference No. 2, it may be difficult to ensure high measurement precision in an actual usage state.

Further, according to the technology described in Patent Reference No. 2, calibration is carried out while a light emitting point generated by a laser light emitting unit is used as a reference point. Thus, calibration of a stereoscopic camera is not carried out by another distance information acquisition part.

An object of an embodiment of the present invention is to provide a distance measuring apparatus in which it is possible to ensure high measurement precision in an actual usage state.

According to the embodiment of the present invention, a distance measuring apparatus is installed in a thing. A distance between the thing and a measuring target varies. The distance measuring apparatus includes a plurality of imaging devices; a first distance acquisition part that acquires a first distance to the measuring target based on respective sets of image data taken by the imaging devices; a second distance acquisition part that acquires a second distance to the measuring target based on a reflected wave of an electromagnetic wave irradiated onto the measuring target; and a holding member that holds the imaging devices and the second distance acquisition part.

Thereby, it is possible to provide a distance measuring apparatus in which it is possible to ensure high measurement precision in an actual usage state.

Hereinafter, using the figures, distance measuring apparatuses, vehicles and methods of calibration in the distance measuring apparatus will be described.

<Distance Measuring Apparatus (1)>

First, a distance measuring apparatus according to an embodiment will be described.

<<Configuration of Distance Measuring Apparatus>>

FIG. 1 is a schematic diagram showing an embodiment of the distance measuring apparatus. As shown in the FIG. 1, the distance measuring apparatus 100 includes cameras 10A and 10B, a first distance acquisition part 50, a second distance acquisition part 20, a holding member 30 and a distance measuring apparatus housing 40. The distance measuring apparatus 100 is installed in a thing such that the distance to a measuring target varies. The thing in which the distance measuring apparatus 100 is installed is a mobile body such as a vehicle, a ship, a railway vehicle or the like, or a fixed body such as a building in a case of being used in FA. Further, the "measuring target" is another mobile body, a person, an animal or the like, or a fixed thing present in a moving direction of a mobile body when the distance measuring apparatus 100 is installed in the mobile body.

<<Configuration of Image Distance Measuring Part>>

An image distance measuring part includes the plurality of cameras (imaging devices) 10A and 10B and the first distance acquisition part 50. In the image distance measuring part, based on of image data (taken images) of a measuring target taken by the cameras 10A and 10B, the first distance acquisition part 50 carries out image processing, a distance measuring process and/or the like. Thus, the distance to the measuring target is acquired (distance measurement).

The cameras 10A and 10B includes image sensors 11A and 11B, image sensor substrates 12A and 12B, camera lenses 13A and 13B and camera housings 14A and 14B, respectively.

The image sensors 11A and 11B are image sensors made of photoelectric converters such as, for example, Complementary MOS (CMOS) image sensors, Charge-Coupled Device (CCD) images sensors or the like. The image sensors 11A and 11B receive object light from a measuring target having passed through the camera lenses 13A and 13B and take images of the measuring target.

The image sensors 11A and 11B are placed on opposite sides of an optical axis of a reflected wave while sandwiching a light reception surface 24 of the second distance acquisition part 20.

The image sensor substrates 12A and 12B are substrates on which the image sensors 11A and 11B are mounted. Image sensor control circuits (not shown) that control operations of the image sensors 11A and 11B are included in the image sensor substrates 12A and 12B.

The camera lenses 13A and 13B correspond to one example of imaging lenses. The camera lenses 13A and 13B transmit the object light from the measuring target, control the incident directions and incident angles of the object light and form images of the measuring target on the respective image sensors 11A and 11B.

The camera housings 14A and 14B are imaging device housings. Elements of the cameras 10A and 10B including the image sensors 12A and 12B and the camera lenses 13A and 13B are contained in the camera housings 14A and 14B, respectively.

The first distance acquisition part 50 is installed on a substrate (not shown) mounted in an imaging device housing 40. The first distance acquisition part 50 includes an image processing part 51, a parallax calculation part 52, a calibration calculation part 53 and a distance calculation part 54.

The image processing part 51 has a function of an image generation part generating images according to signals from the image sensors 11A and 11B. Further, the image processing part 51 carries out image processing for correcting distortion or the like of respective taken images of the cameras 10A and 10B based on the stereoscopic camera parameters that are previously acquired.

The parallax calculation part 52 calculates a parallax d0 of the measuring target (a calibration target) based on taken images of the cameras 10A and 10B corrected by the image processing part 51. A known pattern matching method, for example, is used for calculating a parallax do. In the parallax calculation, a parallax concerning two or more positions for which distances between the image distance measuring part and the measuring target (the calibration target) are mutually different is calculated.

The calibration calculation part 53 acquires, from the second distance acquisition part 20, information concerning distances Z to calibration targets at two or more different positions from the distance measuring apparatus 100.

The calibration calculation part 53 determines a Bf value and Δd from Formula (6) (described later) based on relationship between two or more sets of parallaxes d0 and distances Z acquired from measurement. Calibration is completed when the calculated Bf value and Δd are stored in a memory or the like.

The distance calculation part 54 calculates the distance Z to an object from Formula (6) from a parallax d0 from the parallax calculation part 52 and a Bf value and Δd acquired from calibration.

<<Configuration of Second Distance Acquisition Part>>

The second distance acquisition part 20 measures the distance to a measuring target based on a time elapsed from when emitting an electromagnetic wave to the measuring target until receiving a reflected wave from the measuring target (according to a Time Of Flight (TOF) method).

The second distance acquisition part 20 includes a light source 21, a light source substrate 22, a light projecting lens 23, a light reception device 24, a light reception device substrate 25, a light reception lens 26, a second distance acquisition part housing 27 and a second distance acquisition part control part 60.

The light source 21 emits light toward a measuring target. The light source 21 is, for example, a laser diode. Thus, the light source 21 emits near infrared light of an electromagnetic wave having a wavelength zone of 800 nm to 950 nm.

The light source substrate 22 is a substrate on which the light source 21 is mounted, and drives the light source 21. The light source substrate 22 has a driving circuit for stepping up a voltage given by a vehicle (not shown) up to a prescribed voltage and generates an oscillation signal for causing the light source 21 to emit light. From the light source 21, short pulse light is periodically emitted having the pulse width on the order of nanoseconds to hundreds of nanoseconds as modulated light due to the oscillation signal.

Further, the light source substrate 22 receives a light emitting control signal from the second distance acquisition part control part 60 and a current supplied by a power source (not shown) and supplies a predetermined modulation current to the light source 21.

The light projecting lens 23 transmits light emitted by the light source 21 and controls states such as the emission direction, the emission angle and so forth of the emitted light. The light projecting lens 23 collimates the light emitted by the light source 21 into parallel light (that may be approximately parallel light). Therewith, the second distance acquisition part 20 can carry out distance measurement even for a very small area on a detection target.

The light reception device 24 receives light (referred to as "reflected light") reflected by a measuring target after being emitted by the light source 21 and passing through the light reception lens 26, converts the reflected light into an electric signal (a "received light signal") and transmits the electric signal to a control circuit (not shown) of the vehicle. The reflected light is one (a reflected wave) obtained as a result of near infrared light that is an electromagnetic wave emitted by the light source 21 being reflected by the measuring target. The light reception device 24 can be any one of various sorts of photodiodes such as a silicon P-Intrinsic-N (PIN) photodiode, an Avalanche Photo Diode (APD) or the like.

The light reception device substrate 25 is a substrate on which the light reception device 24 is mounted. The light reception device substrate 25 has a received light signal amplifier circuit amplifying an electric signal of a received light.

The received light signal amplifier circuit amplifies the electric signal that is output from the light reception device 24 and transmits the amplified signal (as a "reflected light signal") to the second distance acquisition part control part 60.

The light reception lens 26 transmits reflected light and controls states such as the incident direction, the incident angle and so forth of the reflected light.

The second distance acquisition part housing 27 contains the elements of the second distance acquisition part 20 including the light source 21 and the light reception device 24.

The second distance acquisition part control part 60 is provided on a substrate mounted in the distance measuring apparatus housing 40. The second distance acquisition part control part 60 includes a light emission control part 61 and a time measuring part 62.

The light emission control part 61 controls light emission of the light source 21.

The time measuring part 62 measures a time from when light is emitted until the light is received, by starting time measurement when a signal is generated by the driving circuit and stopping the time measurement when a signal converted from reflected light is generated.

Thus, in the second distance acquisition part 20, the second distance acquisition part control part 60 is mounted in the distance measuring apparatus housing 40 different from the second distance acquisition part housing 27. Thus, it is possible to reduce the size of the second distance acquisition part housing 27. Therefore, in the second distance acquisition part 20, it is possible to place the second distance acquisition part housing 27 between the cameras 10A and 10B of the image distance measuring part.

Note that the second distance acquisition part control part 60 can be provided on a substrate common with the first distance acquisition part 50. In this case, as a result of a substrate of the second distance acquisition part control part 60 being shared with the first distance acquisition part 50, it is possible to provide the distance measuring apparatus at a lower cost.

In the second distance acquisition part 20 described above, it is possible to calculate the distance to a measuring target from the time difference between the time of light emission from the light source 21 and the time of reception of the reflected light.

That is, light emitted after being modulated by the light emission control part 61 has a form of a light beam having a very small spreading angle after passing through the light projecting lens 23. The light beam emitted by the second distance acquisition part 20 is emitted in a direction (Z-axis direction) perpendicular to an installation plane on which the holding member 30 is installed. The light beam emitted by the second distance acquisition part 20 is incident on a measuring target.

The light beam incident on the measuring target becomes reflected light as a result of being reflected at a reflection point on the measuring target while being scattered in various directions uniformly. Only a light component of the reflected light reflected to pass through the same light path as the light beam incident on the measuring target is incident on the light reception device 24 through the light reception lens 26 that is placed approximately coaxial with the light source 21. The reflected light incident on the light reception device 24 is detected by the light reception device 24 as a reflected light signal.

<<Configuration of Holding Member>>

The holding member 30 is a common member holding at least the image sensors 11A and 11B of the cameras 10A and 10B and at least the light source 21 or the light reception device 24 of the second distance acquisition part 20. By thus holding the cameras 10A and 10B and the second distance acquisition part 20, the holding member 30 can fix (position), in the direction of light emitted by the light source 21 (the distance measuring direction), the distance of the distance measuring origins between the cameras 10A and 10B and the second distance acquisition part 20. Note that the positions of the "distance measuring origins" mean the origins (reference points) of acquiring the distances in the cameras 10A and 10B and the origin (reference point) of acquiring the distance in the second distance acquisition part 20. The distance measuring origins in the cameras 10A and 10B are, for example, the imaging planes (image pickup planes) of the image sensors 11A and 11B. The distance measuring origin in the second distance acquisition part 20 is, for example, the light reception surface of the light reception device 24.

In the second distance acquisition part housing 27 mounted in the holding member 30, the light source substrate 22 and the light reception device substrate 25 are provided. On the light source substrate 22, the light source 21 is mounted, and drives the light source 21. On the light reception device substrate 25, the light reception device 24 is mounted, and amplifies the signal received by the light reception device 24.

By mounting the second distance acquisition part 20 on the holding member 30 at a position between the camera 10A and the camera 10B shown in FIG. 1, it is possible to miniaturize the configuration of the distance measuring apparatus 100.

However, the position of mounting the second distance acquisition part 20 on the holding member 30 is not limited to the above-mentioned position between the camera 10A and the camera 10B.

Further, it is possible that the holding member 30 holds the image sensors 11A and 11B and the light reception device 24 through the camera housings 14A and 14B and the second distance acquisition part housing 27.

<<Distance Measurement Principle and Calibration Method in Stereoscopic Camera>>

Next, a common distance measurement principle and calibration method in a stereoscopic camera will be described.

Figure 2:
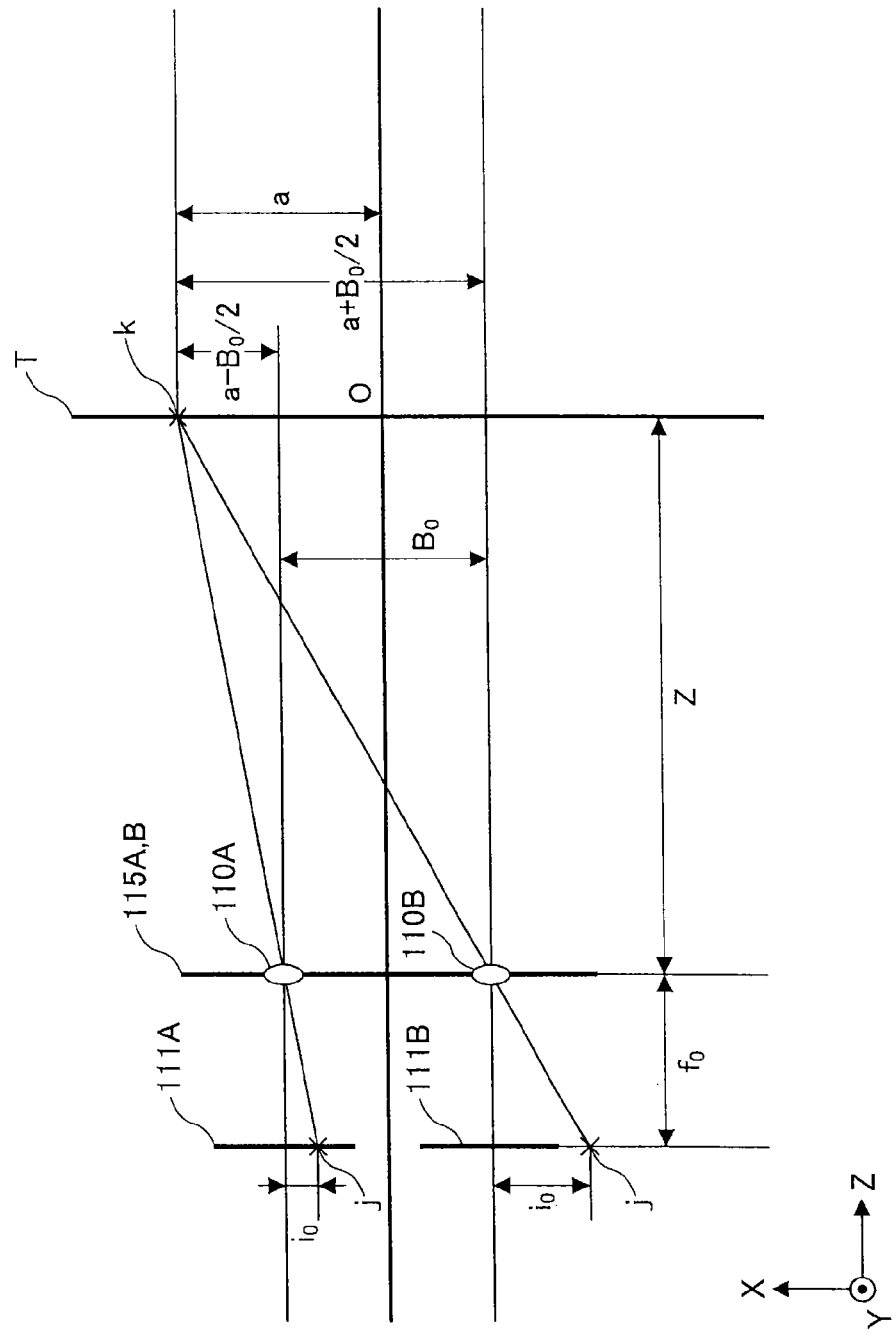
FIGS. 2 and 3 are schematic diagrams showing a distance measurement principle and a calibration method in a common stereoscopic camera.
Figure 3:
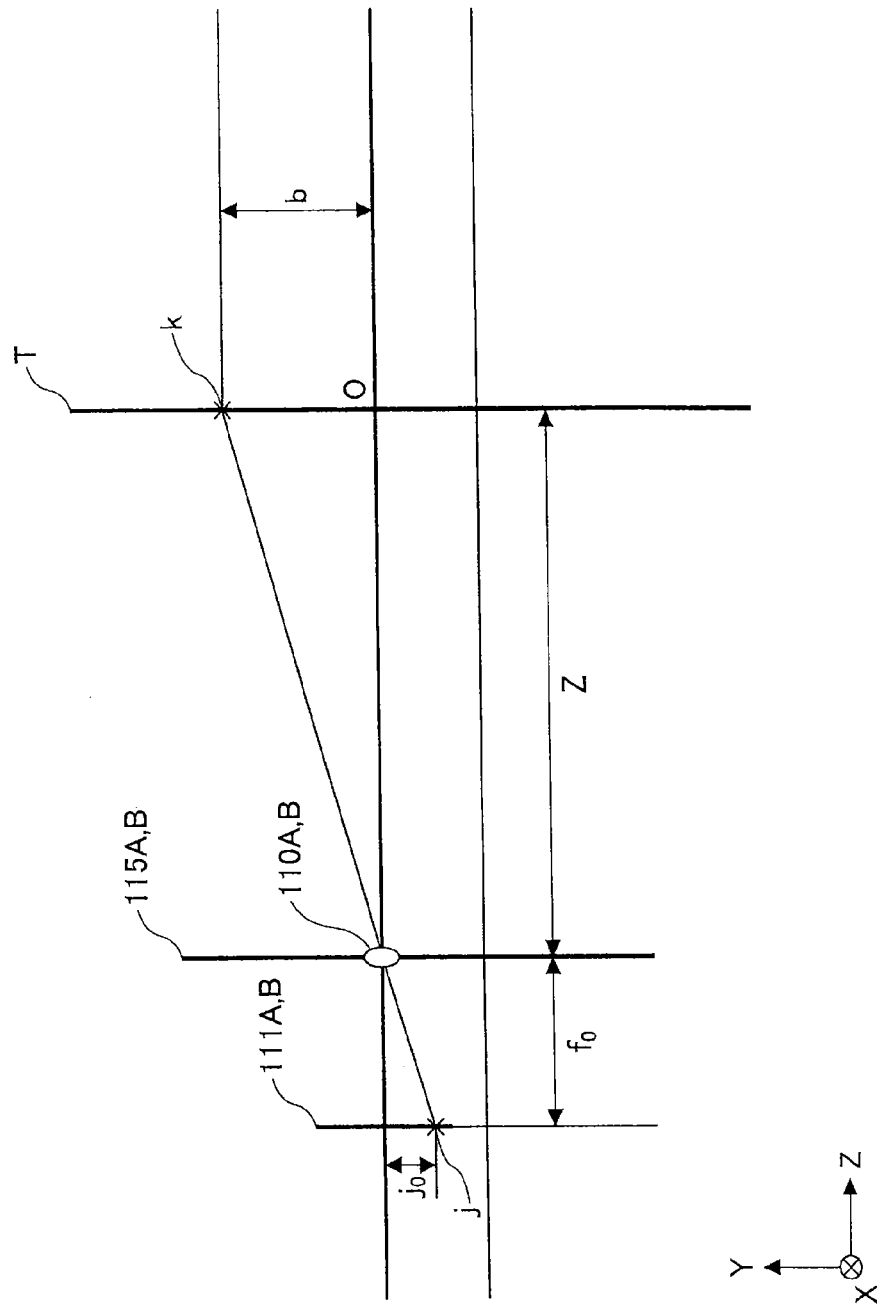

FIGS. 2 and 3 are schematic diagrams showing a distance measurement principle and a calibration method in a common stereoscopic camera.

FIGS. 2 and 3 show relationships between a characteristic point "k" on a measuring target T for calibration ("calibration target T") and characteristic points "j" on image sensors 111A and 111B of a stereoscopic camera 110 (including monocular cameras 110A and 110B), when the monocular cameras 110A and 110B take images of the calibration target T.

In FIGS. 2 and 3, the horizontal direction extending along the surface of the calibration target T will be referred to as an X-axis direction and the vertical direction extending along the surface of the calibration target T will be referred to as a Y-axis direction.

Further, the base length of the stereoscopic camera 110 is referred to as "B0", the focal distance of each of the monocular cameras 110A and 110B is referred to as "f0" and the distance between the optical centers 115A and 115B (the installation position of the stereoscopic camera 110) of the stereoscopic camera 110 and the calibration target T will be referred to as "Z".

In this case, when the characteristic point k on the calibration target T is at a position (a, b, 0), the ideal position (i0, j0) of the characteristic point j in the monocular camera 110A is acquired by the following Formula (1) and Formula (2) from FIGS. 2 and 3:

$$i_0 = \left(a - \frac{B_0}{2}\right) \cdot \frac{f_0}{Z} \quad (1)$$

$$j_0 = b \cdot \frac{f_0}{Z} \quad (2)$$

Further, the ideal position (i0', j0') of the characteristic point j on the monocular camera 110B is determined by the following Formula (3) and Formula (4):

$$i'_0 = \left(a + \frac{B_0}{2}\right) \cdot \frac{f_0}{Z} \quad (3)$$

$$j_{0'} = b \cdot \frac{f_0}{Z} \quad (4)$$

Then, from Formula (1) and Formula (3), the distance Z is acquired from the following Formula (5):

$$Z = \frac{B_0 \cdot f_0}{i'_0 - i_0} = \frac{B_0 \cdot f_0}{d_0} \quad (5)$$

Thus, it is possible to calculate the distance Z from the installation position of the stereoscopic camera 110 to the calibration target T by using the parallax d0 of the monocular cameras 110A and 110B according to Formula (5).

Note that in the monocular cameras 110A and 110B, errors may be included concerning the focal distances and/or the base length between the design values and the actually measured values. Also, an error may be included in the ideal positions the image sensors in the monocular cameras 110A and 110B. Due to these factors and/or the like, the measured parallax may include an error. Therefore, in consideration of these errors, the distance Z is acquired by the following Formula (6):

$$Z = \frac{B \cdot f}{d_0 + \Delta d} \quad (6)$$

There, the actual base length is referred to as "B", the actual focal distance is referred to as "f", the measured parallax is referred to as "d0" and an offset of the parallax is referred to as "Δd".

Formula (6) indicates that, in order to carry out distance measurement in the stereoscopic camera 110 with high precision, it is necessary to calibrate the Bf value (the product of "B" and "f") and Δd in advance.

Figure 4:
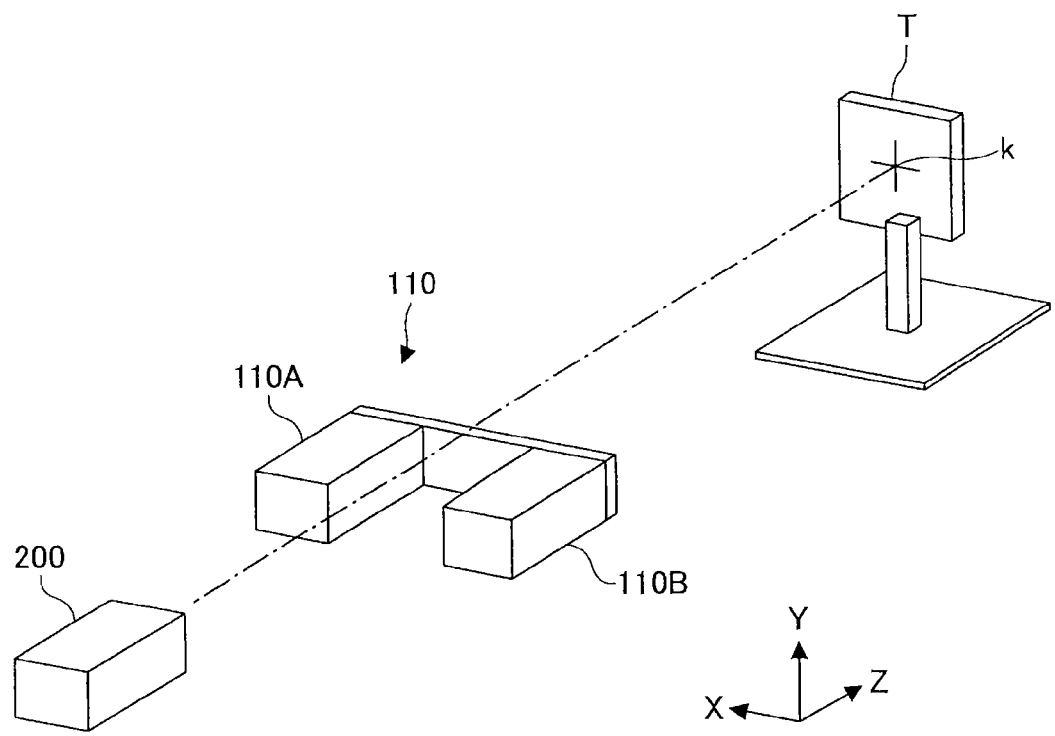
FIG. 4 is a schematic diagram showing a configuration for carrying out calibration in a stereoscopic camera.

FIG. 4 is a schematic diagram showing a configuration for carrying out calibration of the stereoscopic camera 110. As shown in the FIG. 4, in order to carry out calibration of the stereoscopic camera 110, the calibration target T having a characteristic point k is placed in front of the monocular cameras 110A and 110B and the parallax d0 is measured. Here, the distance Z between the monocular cameras 110A and 110B and the calibration target T is known.

The Bf value and Δd are determined from Formula (6) by acquiring two or more sets of parallaxes d0 and distances Z for the calibration target T while the installation position of the calibration target T in the Z-axis direction (the distance measuring direction) is changed.

In the calibration method in which calibration is carried out while the distance to the calibration target T is being measured, it is necessary to precisely acquire the distance Z from the stereoscopic camera 110 to the calibration target T in order to improve the calibration precision.

That is, according to the above-described calibration method, a laser range finder 200 is placed behind the monocular cameras 110A and 110B in the distance measuring direction as shown in FIG. 4. Next, according to the calibration method, the distance between the respective monocular cameras 110A and 110B and the calibration target T are measured by the laser range finder 200, and thus, the distance Z is acquired. Then, according to the calibration method, the thus acquired distance Z is used and the stereoscopic camera 110 is calibrated.

However, according to the above-described calibration method, it is necessary to previously adjust the position of the laser range finder 200 with high accuracy with respect to the installation position of the stereoscopic camera 110. Therefore, according to the above-described calibration method, it may be difficult to carry out this method in a place where a mounting/installation and working space is limited such as the inside of a vehicle.

<<Calibration Method for Distance Measuring Apparatus>>

Next, a method of calibrating the distance measuring apparatus 100 will be described.

Figure 5:
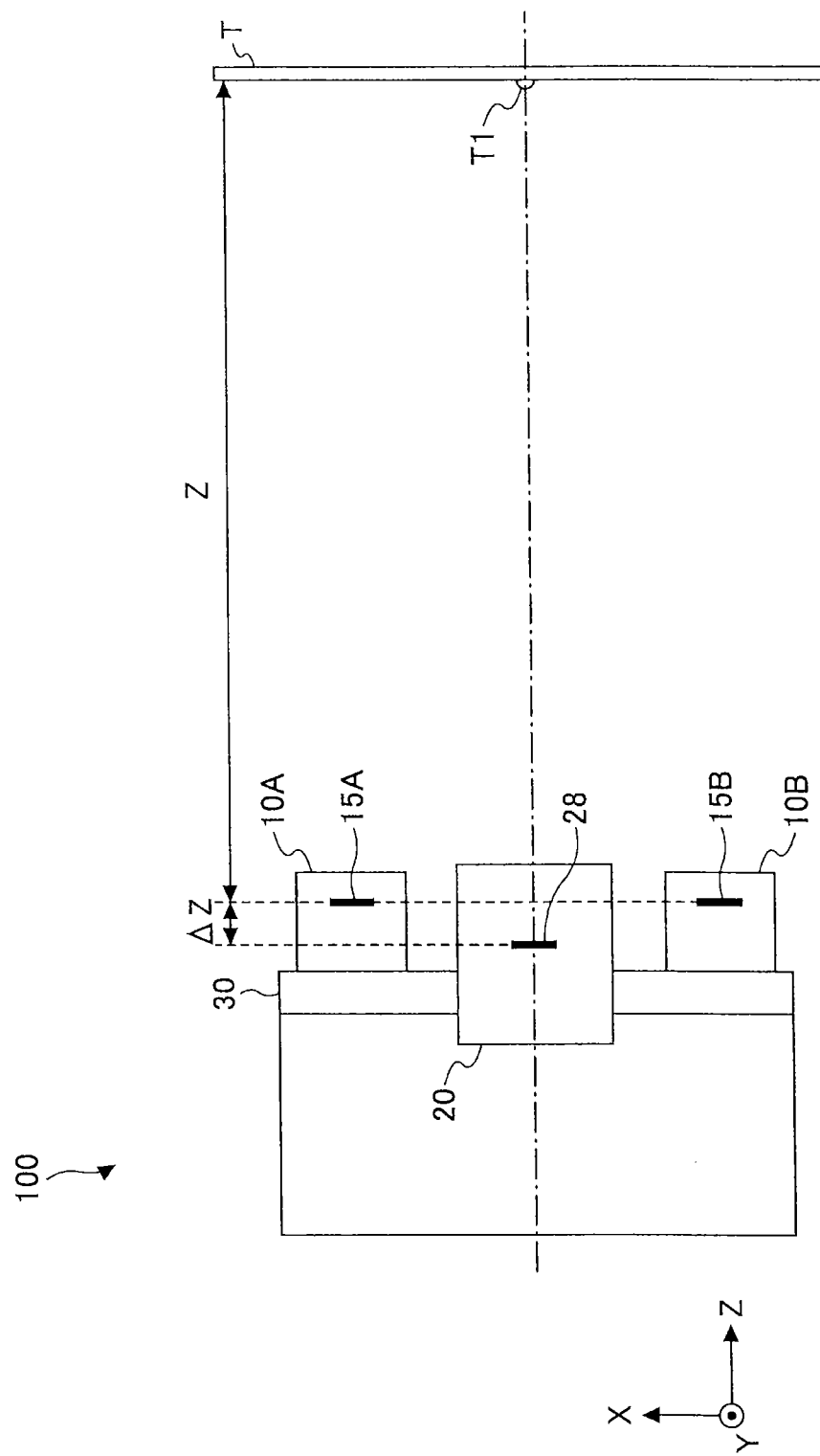
FIG. 5 is a ZX-plane view showing positional relationship between the distance measuring origins of cameras and the distance measuring origin of a second distance acquisition part in the distance measuring apparatus.

FIG. 5 is a ZX-plane view showing positional relationship between the distance measuring origins of the cameras 10A and 10B and the distance measuring origin of the second distance acquisition part 20 in the distance measuring apparatus 100. Further, FIG. 6 is a ZY-plane view showing positional relationship between the distance measuring origins of the cameras 10A and 10B and the distance measuring origin of the second distance acquisition part 20 in the distance measuring apparatus 100.

As described above, in the distance measuring apparatus 100, the cameras 10A and 10B in the image distance measuring part and the second distance acquisition part 20 are mounted on the common holding member 30. That is, in the distance measuring apparatus 100, the relative position between the cameras 10A and 10B and the second distance acquisition part 20 in the Z-axis direction (the distance measuring direction) is previously adjusted and then fixed by the holding member 30. Here, the difference ΔZ between the distance measuring origins 15A and 15B in the cameras 10A and 10B and the distance measuring origin 28 in the second distance acquisition part 20 is known.

Figure 6:
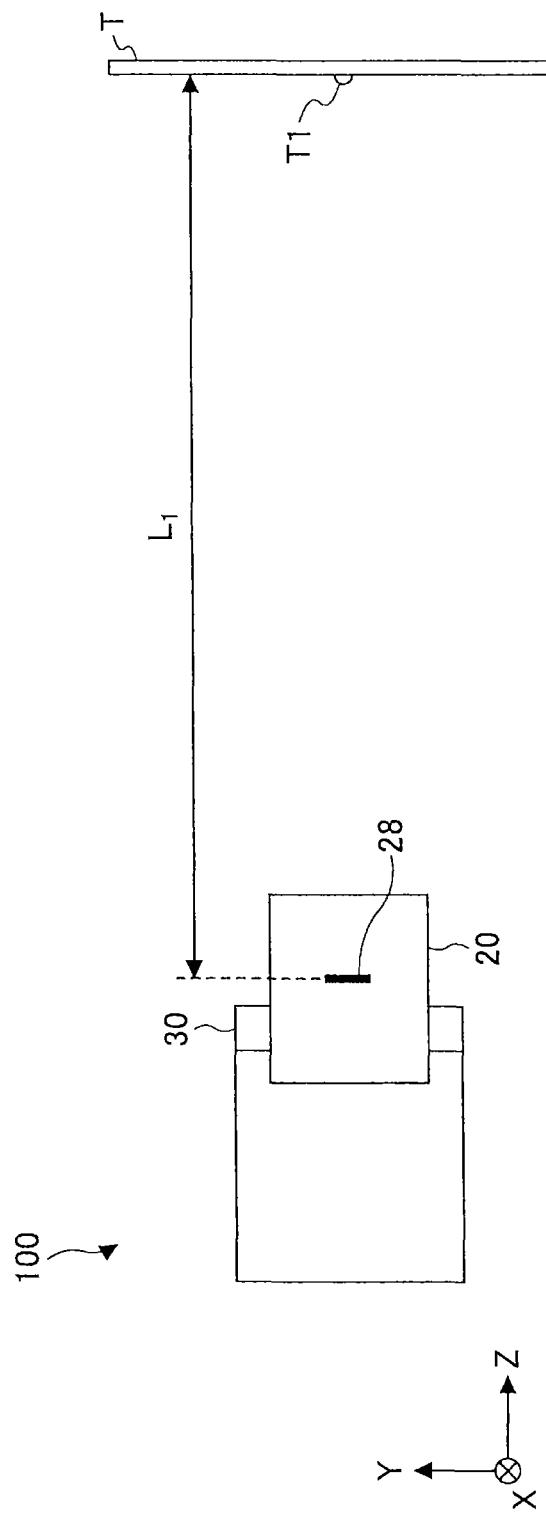
FIG. 6 is a ZY-plane view showing the positional relationship between the distance measuring origins of the cameras and the distance measuring origin of the second distance acquisition part in the distance measuring apparatus.

Therefore, as shown in FIGS. 5 and 6, concerning the distance measuring apparatus 100, it is possible to calculate the distance Z ($=L_1-\Delta Z$) between the image distance measuring part and the calibration target T, from the distance $L_1$ (see FIG. 6) measured by the second distance acquisition part 20 and the known ΔZ.

Note that, the distance measuring apparatus 100 is already calibrated except the base length B and the offset Δd of the parallax. Therefore, the parallax d0 is fixed without regard to the position on the calibration target T where the cameras 10A and 10B take images in the image taking area of the cameras 10A and 10B.

That is, when the distance measuring apparatus 100 is to be calibrated, it is sufficient that the calibration target T has one or more characteristic points T1, the camera 10A and the camera 10B being able to take images thereof simultaneously.

Note that, in consideration of precisely measuring the distance Z between the image distance measuring part and the calibration target T, it is preferable that the position which the second distance acquisition part 20 irradiates with laser light be coincident with the calibration target T.

Figure 7:
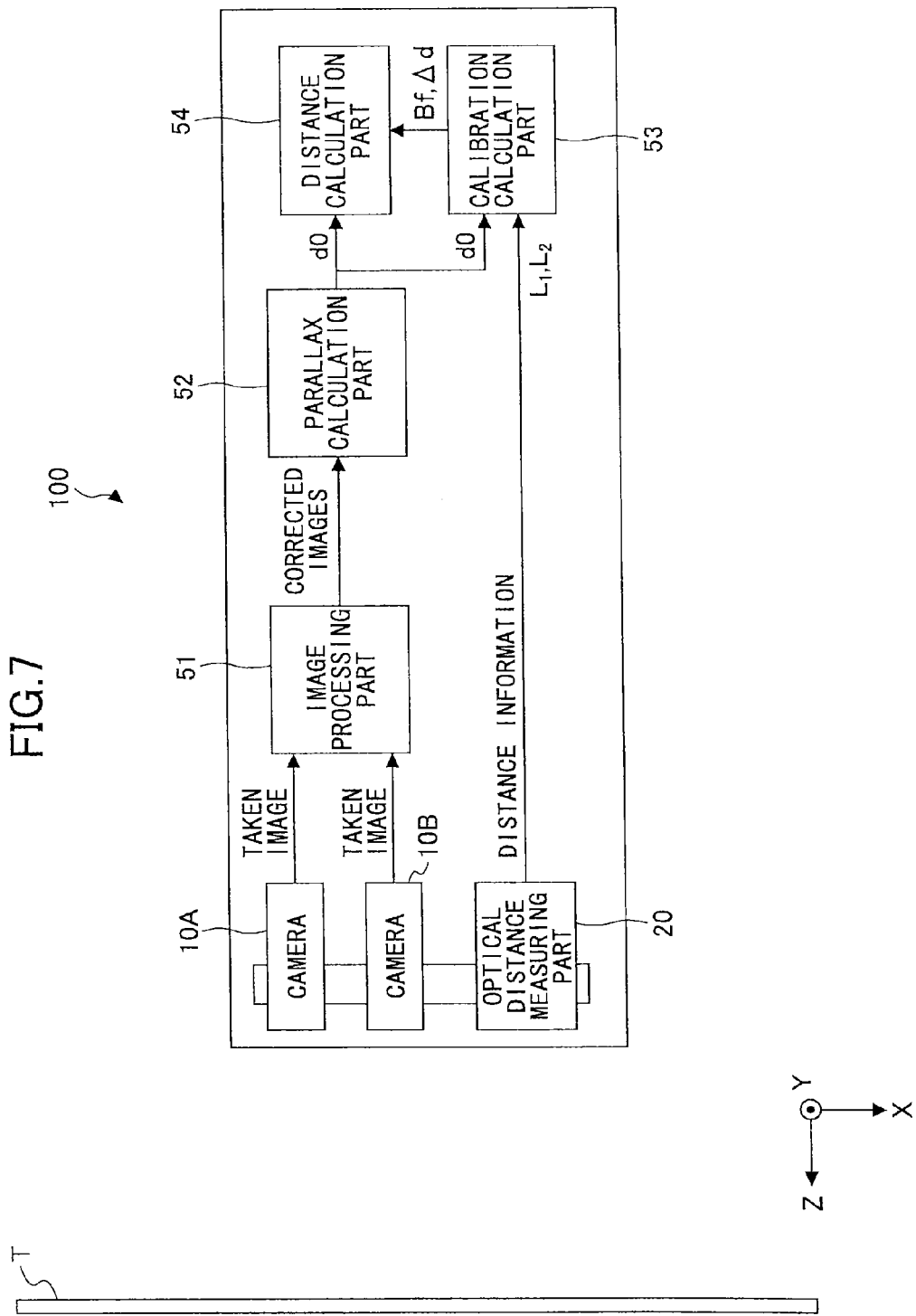
FIG. 7 is a functional block diagram of the distance measuring apparatus.
Figure 8:
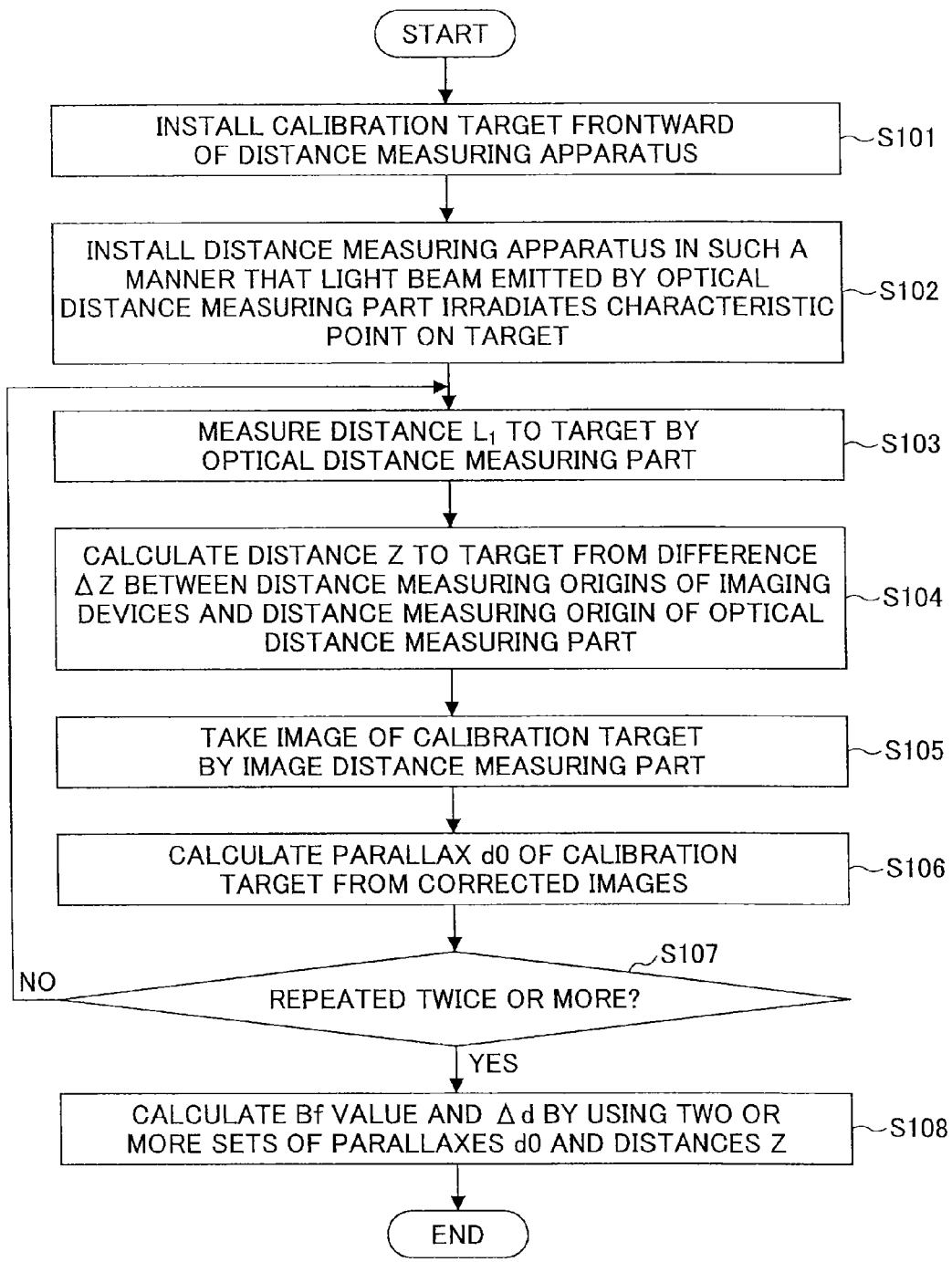
FIG. 8 is a flowchart showing a calibration method of calibrating the distance measuring apparatus.

FIG. 7 is a functional block diagram of the distance measuring apparatus 100. FIG. 8 is a flowchart showing a calibration method of calibrating the distance measuring apparatus 100.

First, when the distance measuring apparatus 100 is to be calibrated, the calibration target T is installed frontward in the distance measuring direction of the distance measuring apparatus 100 (S101).

Next, the distance measuring apparatus 100 is installed at a predetermined position (for example, between the rear-view mirror and the windshield in a vehicle cabin) so that a light beam emitted by the second distance acquisition part (optical distance measuring part) 20 irradiates the characteristic point T1 on the calibration target T (S102).

In the second distance acquisition part 20, after the light source 21 emits a light beam to the calibration target T, the light reception device 24 receives the reflected wave from the calibration target T. The second distance acquisition part 20 measures the distance $L_1$ between the distance measuring origin 28 in the second distance acquisition part 20 and the calibration target T based on the time measured by the time measuring part 62 from when emitting the light beam until receiving the reflected wave (S103).

The distance calculation part 54 calculates the distance Z between the image distance measuring part and the calibration target T from the distance $L_1$ measured by the second distance acquisition part 20 and the known value ΔZ (S104).

The image distance measuring part uses the camera 10A and the camera 10B to take images of the characteristic point T1 on the calibration target T (S105). Images of the characteristic point T1 thus taken are processed by the image processing part 51 and corrected image data (corrected images) is generated.

The parallax calculation part 52 calculates the parallax d0 of the calibration target T from the generated corrected images (S106). The distance measuring apparatus 100 can acquire relationship between Z and d0 necessary to calibrate the first distance acquisition part 50 through the processes in steps S103 to S106.

The distance measuring apparatus 100 needs to acquire two or more sets of values of parallaxes d0 and distances Z in order that the calibration calculation part 53 determines a Bf value and Δd based on the relationship between a parallax d0 and a distance Z. For this purpose, the distance measuring apparatus 100 determines whether the processes of steps S103 to S106 are repeated twice or more (S107).

When the processes of steps S103 to S106 are not repeated twice or more yet (NO in S107), the distance measuring apparatus 100 repeats the processes of steps S103 to S106 for two or more points at which respective distances Z between the distance measuring apparatus 100 and the calibration target T are different.

When the processes of steps S103 to S106 are already carried out twice or more (YES in S107), the calibration calculation part 53 calculates a Bf value and Δd based on the two or more sets of relationships between parallaxes d0 and distances Z (S108) and finishes the calibration.

In the distance measuring apparatus 100 described above, the holding member 30 fixes the positions of the distance measuring origins in the cameras 10A and 10B and the second distance acquisition part 20. Therefore, according to the distance measuring apparatus 100, it is possible to calibrate the first distance acquisition part 50 with high precision even when the distance measuring apparatus 100 is installed in such a place as the inside of a vehicle cabin in which a space to carry out the calibration work is limited.

<<Distance Measuring Apparatus (2)>>

Next, a distance measuring apparatus according to another embodiment of the present invention will be described. In the description below, only points different from the above-described distance measuring apparatus 100 will be described.

Figure 9:
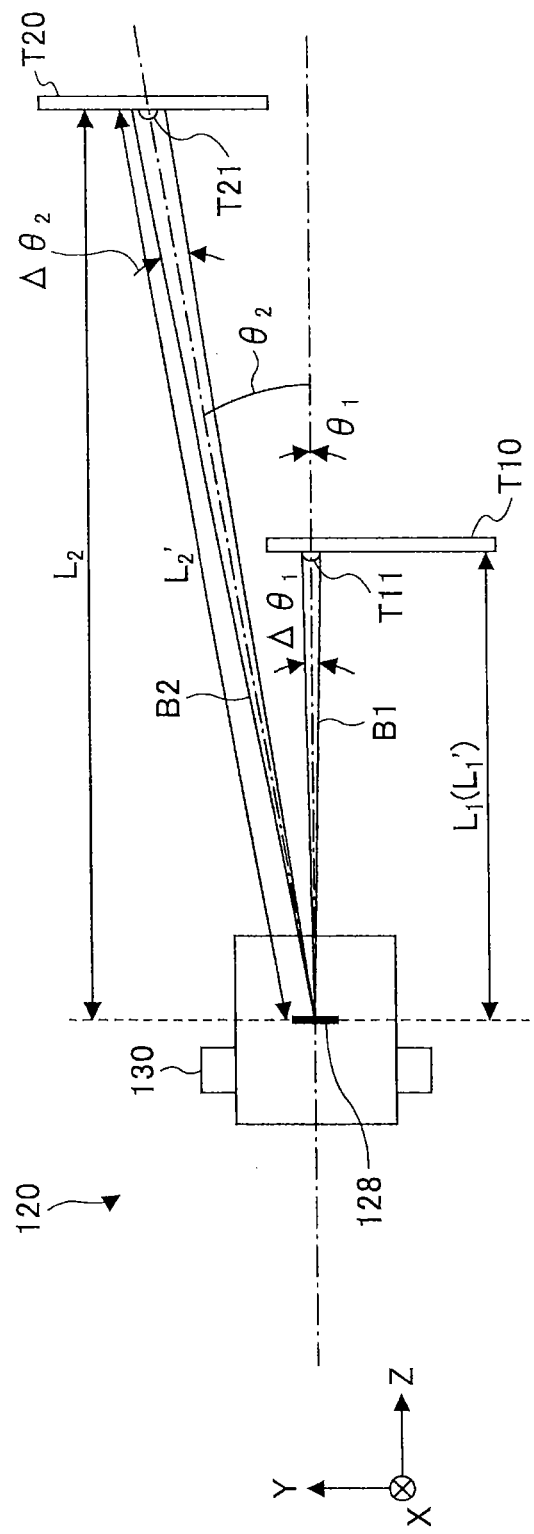
FIG. 9 is a ZY-plane view showing positional relationship between a second distance acquisition part and a calculation target in a distance measuring apparatus according to another embodiment of the present invention.

FIG. 9 is a ZY-plane view showing positional relationships between a second distance acquisition part 120 and calculation targets T10 and T20 in a distance measuring apparatus according to another embodiment of the present invention. As shown in the FIG. 9, in the distance measuring apparatus according to the present embodiment, the configuration of the second distance acquisition part 120 is different from the second distance acquisition part 20 of the distance measuring apparatus 100 described above.

That is, in the distance measuring apparatus according to the present embodiment, the second distance acquisition part 120 emits, from a light source not shown, a first light beam B1 and a second light beam B2 as a plurality of light beams having different angles with respect to the Z-axis (an angle $\theta_2$ is formed between the first light beam B1 and the second light beam B2).

A specific method of generating a plurality of light beams having different emission directions described above is, for example, such that, corresponding to the light beams, a plurality of light sources are provided inside the second distance acquisition part 120.

Further, another method of generating a plurality of light beams having different emission directions described above is, for example, such that, after light emitted by a single light source is collimated into parallel light, the emitted light is branched into a plurality of light beams so that the emission directions of the light beams are changed.

Further, another method of generating a plurality of light beams having different emission directions described above is, for example, such that, 0th-order diffracted light and 1st-order diffracted light generated from causing a parallel light beam to pass through a blazed diffraction plate are used.

However, the specific method of generating a plurality of light beams having different emission directions is not limited to these methods, and another method can be employed.

In the distance measuring apparatus according to the present embodiment, when a first distance acquisition part 50 is calibrated, the first calibration target T10 onto which the first light beam B1 is irradiated and the second calibration target T20 onto which the second light beam B2 is irradiated are installed.

The first calibration target T10 and the second calibration target T20 are installed at different distances from the second distance acquisition part 120 in the distance measuring direction (Z-axis direction).

That is, in the distance measuring apparatus according to the present embodiment, distance measuring areas divided into the plurality of areas corresponding to the first calibration target T10 and the second calibration target T20 having the different installation distances are detected by using the plurality of the first light beam B1 and the second light beam B2 having the different light emission directions, and distance measurement is carried out.

Thus, in the distance measuring apparatus according to the present embodiment, the distance $L_1$ between the first calibration target T10 and the distance measuring origin 128 in the second distance acquisition part 120 and the distance $L_2$ between the second calibration target T20 and the distance measuring origin 128 in the second distance acquisition part 120 are acquired.

Further, in the distance measuring apparatus according to the present embodiment, the above-described first distance acquisition part 50 acquires parallaxes concerning a characteristic point T11 on the calibration target T10 and a characteristic point T21 on the calibration target T20.

When the first light beam B1 and the second light beam B2 in the two directions are used to irradiate the two calibration targets T10 and T20, respectively, it is assumed that the first light beam B1 has a spreading angle $\Delta\theta_1$ and the second light beam B2 has a spreading angle $\Delta\theta_2$. Further, it is assumed that the irradiation angle of the first light beam B1 with respect to a direction (the Z-axis direction) perpendicular to a holding member 130 is $\theta_1$, and the irradiation angle of the second light beam B2 with respect to the direction (the Z-axis direction) perpendicular to the holding member 130 is $\theta_2$.

Then, the relationship of the spreading angles $\Delta\theta_1$, the spreading angles $\Delta\theta_2$, the irradiation angle $\Delta\theta_1$ and the irradiation angle $\Delta\theta_2$ is set to satisfy the following Formula (7):

$$\Delta\theta_1 + \Delta\theta_2 < \theta_1 + \theta_2$$

By satisfying Formula (7), it is possible to separate the light beams in the distance measuring apparatus according to the present embodiment.

Note that, concerning a light beam emitted from a light source with an irradiation angle $\theta_k$, a distance L' between the second distance acquisition part 120 and a calibration target measured by the second distance acquisition part 120 and an actual distance L between the second distance acquisition part 120 and the calibration target satisfies the relationship of the following Formula (8):

$$L' \cos \theta_k = L \tag{8}$$

In the above-mentioned Formula (8), the irradiation angle $\theta_k$ has a known value. Therefore, according to Formula (8), it is possible to calculate the distance L to the calibration target from the value of the distance L' measured by the second distance acquisition part 120. Therefore, it is possible to calculate the distances $L_1$ and $L_2$ to the calibration targets T10 and T20 from the values of the distances $L_1'$ and $L_2'$ measured by the second distance acquisition part 120, respectively, in the same way.

Figure 10:
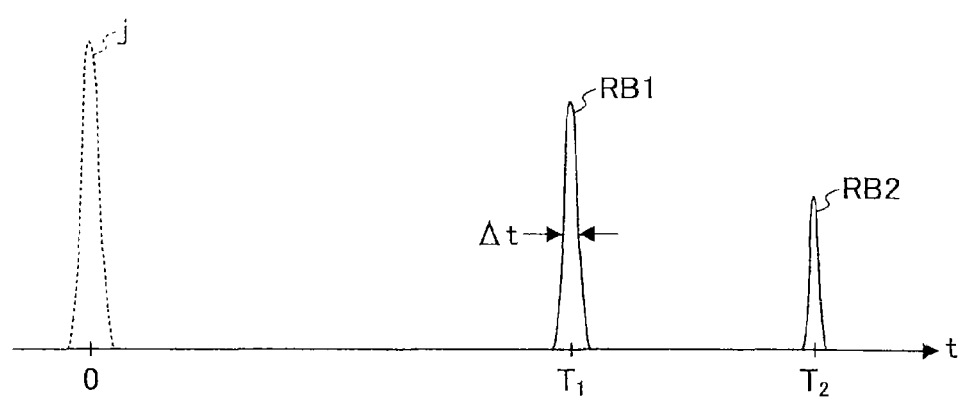
FIG. 10 is a schematic diagram showing one example of a reception signal received by the second distance acquisition part shown in FIG. 9.

FIG. 10 is a schematic diagram showing one example of a reception signal received by the second distance acquisition part 120 shown in FIG. 9. As shown in the FIG. 10, from the light source emitting laser light, a light beam is emitted having a pulse-like temporal waveform corresponding to a light source applied current "i".

Further, a signal corresponding to the reflected light from of the first calibration target T10 received by a light reception device after a time T1 from when the light beam corresponding to the light source applied current "i" is emitted is a reflected light signal RB1. Further, a signal corresponding to the reflected light from of the second calibration target T20 received by the light reception device after a time T2 from when the light beam corresponding to the light source applied current "i" is emitted is a reflected light signal RB2.

A time T and a distance L' satisfy the relationship of the following Formula (9):

$$2L' = c \cdot T \tag{9}$$

There, "c" denotes the speed of light $(=3 \times 10^8$ (m/s)).

In a case where the second distance acquisition part 120 has a single light source and a light beam is divided into a plurality of light beams which are thus emitted, the respective light emission timings of the light beams are the same. In this case, the reflected light signals are acquired corresponding to the respective distances to the calibration targets which are irradiated with the respective light beams.

Assuming that the pulse width of the received reflected light signal is $\Delta t$, the time of receiving the reflected light signal RB1 is $T_1$ and the time of receiving the reflected light signal RB2 is $T_2$ (see FIG. 10), $\Delta t$ and the respective positions of the first calibration target T10 and the second calibration target T20 are set to satisfy the relationship of the following Formula (10):

$$T_2 - T_1 > \Delta t \tag{10}$$

In the distance measuring apparatus according to the present embodiment, the reflected light signal RB1 and the reflected light signal RB2 are prevented from being overlapped with one another as a result of the pulse width $\Delta t$ and the respective positions of the first calibration target T10 and the second calibration target T20 being set to satisfy Formula (10). That is, according to the distance measuring apparatus of the present embodiment, it is possible to precisely measure the distance $L_1$ to the first calibration target T10 and the distance $L_2$ to the second calibration target T20.

In order to satisfy the above-mentioned Formula (10), it is sufficient that the first calibration target T10 and the second calibration target T20 are apart from one another by, for example, 3 m or more in the distance measuring direction (Z-axis direction) when the pulse width $\Delta t$ is 20 ns, for example.

Figure 11:
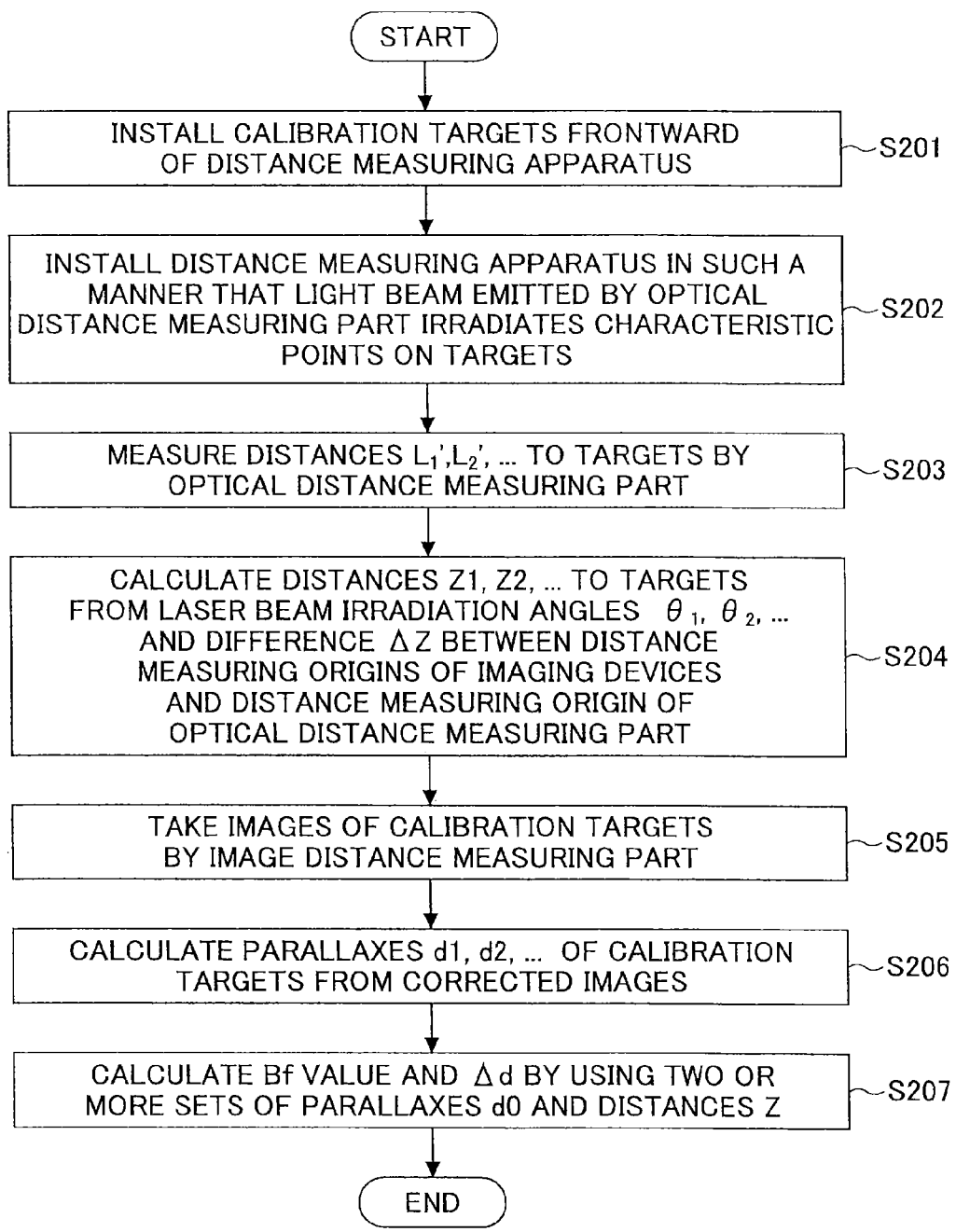
FIG. 11 is a flowchart showing a calibration method in the distance measuring apparatus shown in FIG. 9.

FIG. 11 is a flowchart showing the calibration method concerning the distance measuring apparatus shown in FIG. 9.

First, the first calibration target T10 and the second calibration target T20 are installed frontward in the distance measuring direction of the distance measuring apparatus according to the present embodiment (S201).

Next, the distance measuring apparatus according to the present embodiment is installed at a predetermined position in such a manner that a first light beam B1 irradiates the characteristic point T11 on the first calibration target T10 and a second light beam B2 irradiates the characteristic point T21 on the second calibration target T20 (S202).

The second distance acquisition part (optical distance measuring part) 120 emits a first light beam B1 from the light source to the first calibration target T10 and emits a second light beam B2 from the light source to the second calibration target T20. Thereafter, the light reception device in the second distance acquisition part 120 receives the reflected light from the first calibration target T10 and the reflected light from the second calibration target T20.

The second distance acquisition part 120 measures the distance $L_1$ and the distance $L_2$ based on times measured by a time measuring part from when emitting the first light beam B1 and the second light beam B2 until receiving the reflected light from the first calibration target T10 and the reflected light from the second calibration target T20 (S203).

A distance calculation part 54 calculates the distance Z1 between an image distance measuring part and the first calibration target T10 from the irradiation angle $\theta_1$ of the first light beam B1, the distance $L_1$ and a known value $\Delta Z$. Further, the distance calculation part 54 calculates the distance Z2 between the image distance measuring part and the second calibration target T20 from the irradiation angle $\theta_2$ of the second light beam B2, the distance $L_2$ and the known value $\Delta Z$ (S204).

The image distance measuring part uses a plurality of cameras and takes images of the characteristic point T11 on the first calibration target T10 and the characteristic point T21 on the second calibration target T20 (S205). An image processing part 51 generates corrected images from the taken images of the characteristic point T11 and the characteristic point T21.

A parallax calculation part 52 calculates, from the generated corrected images, the parallax $d_1$ of the first calibration target T10 and the parallax $d_2$ of the second calibration target T20 (S206). In the distance measuring apparatus according to the present embodiment, it is possible to acquire the two sets of the relationships between the distances Zk and the parallaxes $d_k$ required for calibrating the image distance measuring part, i.e., the relationship between Z1 and $d_1$ and the relationship between Z2 and $d_2$ through the processes of steps S203 to S206.

A calibration calculation part 53 calculates the Bf value and $\Delta d$ based on the two sets of the relationships between the distances Zk and the parallaxes $d_k$ (S208), and finishes the calibration.

In the distance measuring apparatus according to the present embodiment, it is possible to acquire a plurality of sets of relationships between distances Zk and parallaxes $d_k$ without changing the position of the calibration targets.

Therefore, it is possible to easily calibrate the image distance measuring part with high precision.

Generally speaking, the longer the distance from the second distance acquisition part 120 to the calibration target becomes, the smaller the amplitude of the reflected light signal received by the light reception device becomes.

Therefore, it is possible to reduce the intensity difference in the reflected light among the calibration targets by the following method. That is, the reflectances of the first calibration target T10 and the second calibration target T20 are made different therebetween. A specific method thereof can be such that, for example, fine glass beads or corner reflectors are used for the second calibration target T20 to increase the reflectance.

That is, in order to reduce the intensity difference in the reflected light among the calibration targets, the reflectance is made different between the first calibration target T10 and the second calibration target T20, for example.

Another method of reducing the intensity difference in the reflected light among the calibration targets can be such that, for example, the projection intensity is made different between a first light beam B1 and a second light beam B2.

By providing such a configuration, in the distance measuring apparatus according to the present embodiment, it is possible to reduce the intensity difference in the reflected light between the first calibration target T10 and the second calibration target T20. Thereby, in the distance measuring apparatus according to the present embodiment, it is possible to acquire the light reception timings of the reflected light signals RB1, RB2 more precisely, and thus, it is possible to measure the distances $L_1$ and $L_2$ more precisely.

<<Distance Measuring Apparatus (3)>>

Next, a distance measuring apparatus according to another embodiment of the present invention will be described. In the following description, only points different from the above-described distance measuring apparatus 100 will be described.

Figure 12:
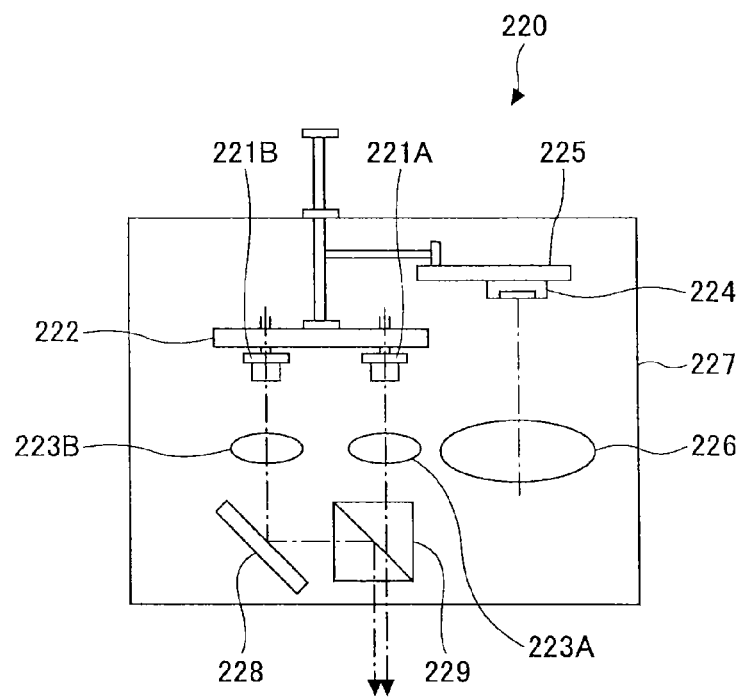
FIG. 12 is a schematic diagram of a second distance acquisition part in a distance measuring apparatus in further another embodiment of the present invention.

FIG. 12 is a schematic diagram of a second distance acquisition part 220 in another embodiment of the present invention. As shown in the FIG. 12, in a distance measuring apparatus according to the present embodiment, a configuration of the second distance acquisition part 220 is different from the second distance acquisition part 20 in the distance measuring apparatus 100.

The second distance acquisition part 220 includes light sources 221A and 221B, a light source substrate 222, light projecting lenses 223A and 223B, a light reception device 224, a light reception device substrate 225, a light reception lens 226 and a second distance acquisition part housing 227. Further, the second distance acquisition part 220 includes a dichroic mirror 228 and a dichroic prism 229.

The light source 221B, the light projecting lens 223B, the dichroic mirror 228 and the dichroic prism 229 correspond to one example of a visible light emitting part.

The second distance acquisition part 220 includes, in addition to the light source 221A that emits a light beam in a near infrared zone (hereinafter, referred to as a "near infrared light beam") for measuring a distance using laser light, the light source 221B that emits a light beam in a visible zone (hereinafter, referred to as a "visible light beam").

Normally, near infrared light is used for the purpose of measuring a distance using laser light. In this case, it is difficult to visually confirm that a characteristic point on a calibration target is actually irradiated with a near infrared light beam emitted by the light source 221A for measuring a distance. Therefore, in order to confirm that a near infrared light beam emitted by the light source 221A actually irradiates the characteristic point on the calibration target, it is necessary to use a dedicated image taking camera, for example, to observe the irradiated area when adjusting the position of the calibration target.

Therefore, in the distance measuring apparatus according to the present embodiment, in addition to the light source 221A that emits a near infrared light beam, the light source 221B that emits a visible light beam is provided.

Further, the second distance acquisition part 220 includes, not only the light projecting lens 223A that transmits light emitted by the light source 221A and controls states such as the emission direction and/or the emission angle of the emitted light, but also the light projecting lens 223B that transmits light emitted by the light source 221B and controls states such as the emission direction and/or the emission angle of the emitted light.

The light projecting lenses 223A and 223B collimate light beams emitted by the light sources 221A and 221B into parallel light beams.

The dichroic mirror 228 and the dichroic prism 229 are optically coupled devices that synthesize a near infrared light beam and a visible light beam so that these light beams are emitted coaxially.

Note that, in the distance measuring apparatus according to the present embodiment, it is also possible to use a polarization beam splitter as the optically coupled device. When the polarization beam splitter is used to synthesize light beams, the near infrared light beam emitted from the light source 221A and the visible light beam emitted from the light source 221B are caused to be emitted with their polarization directions mutually different by 90°, and the light beams are synthesized.

Further, it is sufficient that the visible light beam emitted from the light source 221B is emitted only when the calibration target is being installed. However, it is also possible that, for example, for the purpose of confirming a displacement of the calibration target during a calibration work, the visible light beam is emitted from the light source 221B.

Note that the power of the light source 221B when it emits a visible light beam is such that the light beam can be observed visually (on the order of 1 mW). That is, the output of the light source 221B is much lower than the output peak intensity (several watts to several tens of watts) of the near infrared light beam of the light source 221A. Therefore, the power of the light source 221B when it emits a visible light beam does not affect the optical distance measurement.

In the distance measuring apparatus according to the present embodiment described above, it is possible to easily know a laser irradiation position visually, and thus, it is possible to carry out calibration work more easily.

<<Vehicle>>

Next, a vehicle according to an embodiment of the present invention will be described.

Figure 13:
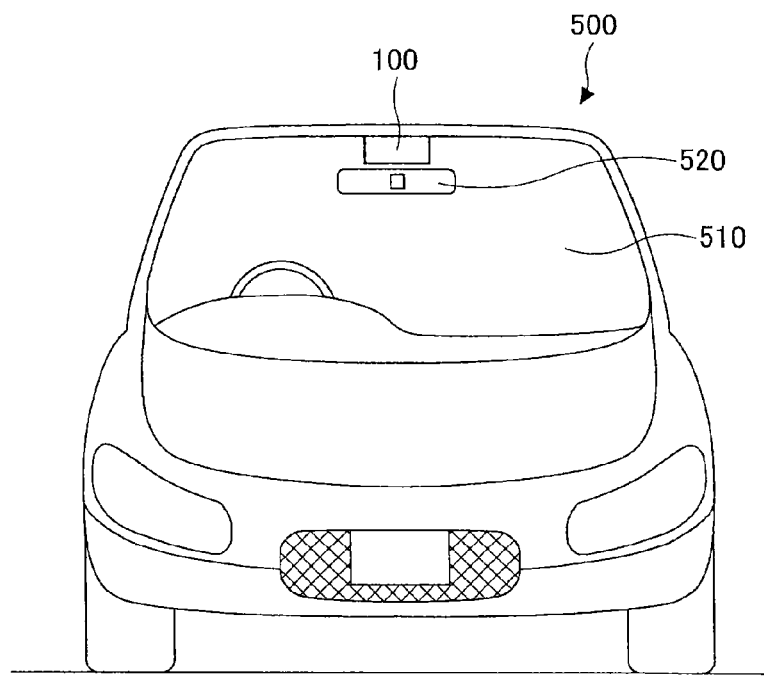
FIG. 13 is a front view showing a vehicle in a yet another embodiment of the present invention.

FIG. 13 is a front view showing a vehicle according to an embodiment of the present invention. As shown in the FIG. 13, a vehicle 500 includes the distance measuring apparatus 100 according to the embodiment of the present invention near an inner rearview mirror 520 inside (on the side of the vehicle cabin) the windshield 510 at a top position.

However, the position of installing the distance measuring apparatus 100 is not limited to the above-mentioned position, and the distance measuring apparatus 100 can be installed anywhere as long as the distance measuring apparatus 100 can detect a situation outside the vehicle 500 frontward in the moving direction of the vehicle 500.

Note that the directions along the width directions of the vehicle 500 (left and right directions in FIG. 13) will be referred to as vehicle width directions and a direction passing through FIG. 13 will be referred to as a vehicle moving direction.

The vehicle 500 includes a vehicle control apparatus (not shown) that controls various functions of the vehicle 500 such as power control, brake control, steering effort control, display control of a display device (not shown) and so forth. The vehicle control apparatus carries out various operations implementing active safety to improve safe performance by assisting travelling of the vehicle 500 based on information (as to whether a detection target is present, the distance and direction of the detection target, the size of the detection target and so forth) concerning a detection target detected by the distance measuring apparatus 100.

That is, the distance measuring apparatus 100 emits a light beam to irradiate a detection target, receives the reflected light of the light beam from the detection target, measures a time from when emitting the light beam until receiving the reflected light and calculates the distance to the detection target.

Based on the distance to the detection target, the vehicle control apparatus of the vehicle 500 carries out control to implement active safety by lowering the speed of the vehicle 500, stopping the vehicle 500, warning the driver by using a sound or an image, or so when the distance to the detection target is within a predetermined range.

Further, the distance measuring apparatus 100 takes an image of a situation frontward in the vehicle 500 moving direction. The vehicle control apparatus in the vehicle 500 carries out image recognition using the taken image to determine a detection target. That is, the vehicle control apparatus recognizes an attribute of the detection target such as whether the detection target is a vehicle or a person, or so, and improve the precision of the various operations implementing active safety.

Further, the vehicle control apparatus detects the position of a white line on the road and/or the edges of the road from the image taken by the distance measuring apparatus 100 and carries out lane departure prevention control for the vehicle 500.

In the vehicle 500 described above, the cameras 10A, 10B and the second distance acquisition part 20 are integrally mounted on the holding member 30 of the distance measuring apparatus 100. As a result, even when the distance measuring apparatus 100 is installed at a place such as the inside of the vehicle cabin where a space of carrying out calibration work is limited, it is possible to carry out calibration of the image distance measuring part with high precision.

Thus, the distance measuring apparatuses, the vehicle and the methods of calibration in the distance measuring apparatus have been described in the embodiments. However, the present invention is not limited to the specifically disclosed embodiments and variations and modifications may be made without departing from the scope of the present invention.

The present application is based on and claims the benefit of priority of Japanese Priority Application No. 2013-134570 dated Jun. 27, 2013 and Japanese Priority Application No. 2014-128261 dated Jun. 23, 2014, the entire contents of which are hereby incorporated herein by reference.

What is claimed is:

1. A distance measuring apparatus installed in a thing, a distance between the thing and a measuring target varying, the distance measuring apparatus comprising:
    a plurality of imaging devices;
    first distance acquisition circuitry that acquires a first distance to the measuring target based on sets of image data taken by the respective imaging devices;
    second distance acquisition circuitry that irradiates an electromagnetic wave onto the measuring target and acquires a second distance to the measuring target based on a reflected wave of the electromagnetic wave;
    a holding member that holds the imaging devices and the second distance acquisition circuitry such that there is a distance in a direction parallel with optical axes of the imaging devices between a point from which the first distance is measured and a point from which the second distance is measured; and
    calibration calculation circuitry that calibrates the first distance based on the distance in the direction parallel with the optical axes of the imaging devices between the point from which the first distance is measured and the point from which the second distance is measured.

2. The distance measuring apparatus as claimed in claim 1, wherein
    the holding member fixes positions, in the direction parallel with the optical axes of the imaging devices, of the imaging devices and the second distance acquisition circuitry.

3. The distance measuring apparatus as claimed in claim 2, wherein
    the holding member fixes the distance between the position of the point from which the first distance is measured in the direction parallel with the optical axes of the imaging devices and the point from which the second distance is measured in the direction parallel with the optical axes of the imaging devices.

4. A distance measuring apparatus installed in a thing, a distance between the thing and a measuring target varying, the distance measuring apparatus comprising:
    a plurality of imaging devices;
    first distance acquisition circuitry that acquires a first distance to the measuring target based on sets of image data taken by the respective imaging devices; and
    second distance acquisition circuitry that irradiates an electromagnetic wave onto the measuring target and acquires a second distance to the measuring target based on a reflected wave of the electromagnetic wave, wherein
    a distance in a direction parallel with optical axes of the imaging devices between a point from which the first distance is measured and a point from which the second distance is measured is determined and used to calibrate the first distance acquisition circuitry.

5. The distance measuring apparatus as claimed in claim 1, wherein
    the calibration calculation circuitry calibrates the first distance based on the second distance acquired by the second distance acquisition circuitry.

6. The distance measuring apparatus as claimed in claim 4, further comprising:
    a calibration calculation circuitry that calibrates the first distance based on the second distance acquired by the second distance acquisition circuitry.

7. The distance measuring apparatus as claimed in claim 1, wherein
    the calibration calculation circuitry calibrates the first distance based on the first distance, the second distance and the distance in the direction parallel with optical axes of the imaging devices between the point from which the first distance is measured and the point from which the second distance is measured.

8. The distance measuring apparatus as claimed in claim 4, further comprising
    a calibration calculation circuitry that calibrates the first distance based on the first distance, the second distance and the distance in the direction parallel with optical axes of the imaging devices between the point from which the first distance is measured and the point from which the second distance is measured.

9. The distance measuring apparatus as claimed in claim 1, wherein
the first distance acquisition circuitry includes
image processing circuitry that generates corrected image data by correcting the image data,
parallax calculation circuitry that calculates a parallax value of the measuring target based on the corrected image data, and
distance calculation circuitry that calculates a distance to the measuring target based on the parallax value.

10. The distance measuring apparatus as claimed in claim 4, wherein
the first distance acquisition circuitry includes
image processing circuitry that generates corrected image data by correcting the image data,
parallax calculation circuitry that calculates a parallax value of the measuring target based on the corrected image data, and
distance calculation circuitry that calculates a distance to the measuring target based on the parallax value.

11. The distance measuring apparatus as claimed in claim 1, wherein
the second distance acquisition circuitry acquires the second distance while dividing an area for acquiring the second distance into a plurality of areas, and
the second distance acquisition circuitry uses the electromagnetic waves having degrees of intensity made to be different from each other to be irradiated onto the plurality of areas.

12. The distance measuring apparatus as claimed in claim 4, wherein
the second distance acquisition circuitry acquires the second distance while dividing an area for acquiring the second distance into a plurality of areas, and
the second distance acquisition circuitry uses the electromagnetic waves having degrees of intensity made to be different from each other to be irradiated onto the plurality of areas.

13. The distance measuring apparatus as claimed in claim 1, comprising:
visible light emitting circuitry that emits visible light coaxial to a light emission axis of the electromagnetic wave emitted by the second distance acquisition circuitry.

14. The distance measuring apparatus as claimed in claim 4, comprising:
visible light emitting circuitry that emits visible light coaxial to a light emission axis of the electromagnetic wave emitted by the second distance acquisition circuitry.

15. A vehicle comprising
the distance measuring apparatus as claimed in claim 1, wherein
the distance measuring apparatus measures a distance to the measuring target outside the vehicle frontward in a vehicle moving direction.

16. A vehicle comprising
the distance measuring apparatus as claimed in claim 4, wherein
the distance measuring apparatus measures a distance to the measuring target outside the vehicle frontward in a vehicle moving direction.

17. A method of using the distance measuring apparatus claimed in claim 1 and calibrating the distance to the measuring target, the method comprising:
measuring, by the first distance acquisition circuitry, respective first distances to a plurality of calibration measuring targets having mutually different distances from the distance measuring apparatus;
measuring, by the second distance acquisition circuitry, respective second distances to the calibration measuring targets; and
calibrating the first distance based on the second distance.

18. A method of using the distance measuring apparatus claimed in claim 4 and calibrating the distance to the measuring target, the method comprising:
measuring, by the first distance acquisition circuitry, respective first distances to a plurality of calibration measuring targets having mutually different distances from the distance measuring apparatus;
measuring, by the second distance acquisition circuitry, respective second distances the calibration measuring targets; and
calibrating the first distance based on the second distance.

19. The method as claimed in claim 17, wherein
the calibration measuring targets have mutually different reflectances.

20. The method as claimed in claim 18, wherein
the calibration measuring targets have mutually different reflectances.

* * * * *